(12) United States Patent
Lee (10) Patent No.: US 10,064,081 B2
(45) Date of Patent: Aug. 28, 2018

(54) APPARATUS AND METHOD FOR CONTROLLING MOBILE DEVICE ENGAGING WITH VEHICLE

(71) Applicant: HYUNDAI MOTOR COMPANY, Seoul (KR)

(72) Inventor: Seung Cheol Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 242 days.

(21) Appl. No.: 15/145,479

(22) Filed: May 3, 2016

(65) Prior Publication Data

US 2017/0118664 A1    Apr. 27, 2017

(30) Foreign Application Priority Data

Oct. 26, 2015  (KR) ........................ 10-2015-0148615

(51) Int. Cl.
*H04W 24/08* (2009.01)
*H04W 4/80* (2018.01)
*H04M 1/725* (2006.01)
*H04W 4/00* (2018.01)
*H04M 1/60* (2006.01)

(52) U.S. Cl.
CPC ....... *H04W 24/08* (2013.01); *H04M 1/72527* (2013.01); *H04W 4/008* (2013.01); *H04W 4/80* (2018.02); *H04M 1/6083* (2013.01)

(58) Field of Classification Search
CPC ............. G06F 11/0793; G06F 11/1402; G06F 11/0739; G06F 11/074; H04W 24/08; H04W 4/80; H04W 4/008; H04M 1/72527; H04M 1/6083

USPC ................. 345/545–551; 709/234; 358/1.17; 365/189.05, 230.08; 710/52–61; 711/3, 711/118–146

See application file for complete search history.

(56) References Cited

U.S. PATENT DOCUMENTS

| 9,116,563 | B2 * | 8/2015 | Kurosawa ............... G06F 3/041 |
| 9,144,094 | B2 * | 9/2015 | Bhamidipati .... H04N 21/42207 |
| 9,304,000 | B2 * | 4/2016 | Yamaguchi ............ G01C 21/20 |
| 2003/0156097 | A1 * | 8/2003 | Kakihara ........... G01C 21/3667 345/156 |

(Continued)

FOREIGN PATENT DOCUMENTS

| KR | 10-2012-0017686 A | 2/2012 |
| KR | 10-2013-0090229 A | 8/2013 |

(Continued)

OTHER PUBLICATIONS

Korean Notice of Allowance dated Mar. 13, 2017, issued in Korean Patent Application No. 10-2015-0148615.

*Primary Examiner* — Matthew C Sams
(74) *Attorney, Agent, or Firm* — McDermott Will & Emery LLP (57) ABSTRACT

A method for controlling a mobile device engaging with a head unit of vehicle includes executing a vehicle engagement application installed in the mobile device, determining first and second spaces having the same size in a frame buffer, monitoring whether a first data responsive to an execution of the vehicle engagement application is written in the first and second spaces, and if the first data is not written in the first and second spaces, performing an autonomous recovery process for the vehicle engagement application.

18 Claims, 9 Drawing Sheets

(56) References Cited

U.S. PATENT DOCUMENTS

| | | | |
|---|---|---|---|
| 2010/0302264 A1* | 12/2010 | Segawa | G06F 3/1462 345/545 |
| 2012/0102373 A1* | 4/2012 | Waugh | G06F 11/0769 714/57 |
| 2014/0120829 A1* | 5/2014 | Bhamidipati | H04N 21/42207 455/3.06 |

FOREIGN PATENT DOCUMENTS

| | | |
|---|---|---|
| KR | 10-1368966 B1 | 3/2014 |
| KR | 10-1480653 B1 | 1/2015 |
| KR | 10-1526358 B1 | 6/2015 |
| KR | 10-2015-0079820 A | 7/2015 |
| KR | 10-2015-0100231 A | 9/2015 |
| WO | 2013-179637 A1 | 12/2013 |
| WO | WO-2013179637 A1 * 12/2013 ........... G06F 3/1454 |  |

* cited by examiner

APPARATUS AND METHOD FOR CONTROLLING MOBILE DEVICE ENGAGING WITH VEHICLE

CROSS-REFERENCE TO RELATED APPLICATION

This application claims the benefit of priority to Korean Patent Application No. 10-2015-0148615, filed on Oct. 26, 2015 with the Korean Intellectual Property Office, the disclosure of which is hereby incorporated by reference as if fully set forth herein.

TECHNICAL FIELD

The disclosure relates to an apparatus and a method for engaging a vehicle with a mobile device, and more particularly, to an apparatus and a method for mirroring a mobile device on a multimedia screen included in a vehicle.

BACKGROUND

To meet the demands of time when services developed based on an information technology (IT) are expanded, plural services based on advanced IT are demanded in a vehicle. Customers do not merely use advanced IT service through their mobile devices but also would like to access or utilize advanced IT services via plural devices or apparatuses including a vehicle. Automotive electronics have been used to provide information regarding fuel efficiency and engine functions to a driver. Recently, automotive electronics can provide driving information based on real-time traffic information, vehicle diagnosis via a mobile device, video/audio streaming services via a cloud service, or the like.

Apple Inc. and Google Inc., which are large suppliers providing hardware and operating systems for mobile devices, have launched vehicle engagement applications for mobile device such as "Apple CarPlay" and "Android Auto" via their application markets.

By way of example but not limitation, provided by the Car Connectivity Consortium (CCC) which is a group of carmakers and phone manufacturers including Volkswagen AG, General Motors Co., Hyundai Motor Co., Samsung Electronics Co. and HTC Corp, MirrorLink™ (i.e., an open-source Android-based system that allows people to connect to car dashboards from their smartphones) has proliferated. MirrorLink™ may have been developed based on an assumption that most customers would like to control, or connect, to their mobile devices via an in-vehicle human machine interfaces (HMI). For example, MirrorLink™ techniques can provide bi-directional control between a vehicle including a human machine interfaces (HMI) such as a touch screen, a rotary knob, a steering wheel with a control panel, or the like, and a mobile device engaging with the vehicle. To achieve bi-directional control, MirrorLink™ techniques can use not only a virtual network computing (VNC) protocol for displaying information and controlling a device but also a real time protocol (RTP) for voice handling. When the mobile device engages with a head unit of a vehicle, a network based on an Internet Protocol (IP) can be formed between the mobile device and the head unit. Then, an authorization process between the mobile device and the head unit can progress, and an application installed in the mobile device can be shown via a screen included in the head unit.

Further, in China, plural information technology (IT) companies such as Baidu, Inc., Tencent Holdings Limited and etc. have independently provided an application for a mobile device, which can arrange the engagement between the mobile device and an Audio-Video Navigation (AVN) device included in the vehicle.

These applications are designed for engagement between the mobile device and the AVN device, and can allow drivers or passengers to access applications included in a mobile device. Further, in ecosystems provided by Apple, Inc., Google, Inc., Baidu, Inc. or the like, applications engaged with a vehicle can be distributed via a mobile device and allowed to be updated frequently so as to overcome restrictions regarding functional expandability (or connectivity) or trending functions which may be included in a conventional vehicle.

SUMMARY

An apparatus and a method for use in a mobile device can be provided in order that, while the mobile device engages with the vehicle, a situation when a screen of an AVN device included in a vehicle works abnormally because of malfunction caused by the mobile device can be detected and autonomously recovered via an operating system (OS) in the mobile device.

Further, for avoiding taking driver's mind off his or her driving and/or hindering his or her safe driving, an apparatus and a method can be provided so as to block or restrain delivering an error incurred on a mobile device into a screen of an AVN device.

A method can be provided for controlling a mobile device engaging a head unit of vehicle. The method can include executing a vehicle engagement application installed in the mobile device, determining first and second spaces having the same size in a frame buffer, and monitoring whether a first data responsive to execution of the vehicle engagement application is written in the first and second spaces. If the first data is not written in the first and second spaces, the method can perform an autonomous recovery process for the vehicle engagement application.

The step of determining first and second spaces can include initializing a predetermined space where the first and second spaces are located in the frame buffer, and delivering addresses corresponding to the first and second spaces included in the predetermined space into the vehicle engagement application.

The method can further include delivering an event corresponding to a given input into the vehicle engagement application, and checking whether a second data corresponding to the given input is included in at least one of the first and second spaces. According to a checking result about the second data, the method can perform the autonomous recovery process for the vehicle engagement application.

The step of performing an autonomous recovery process can include analyzing an error incurred on the vehicle engagement application, requesting addition resources when the error is relevant to a lack of resources, and restarting the vehicle engagement application in response to the error.

In the step of performing an autonomous recovery process, a data processor included in the mobile device can assign a high priority for allocating available resources to the vehicle engagement application.

The method can further include converting information including the first data written in at least one of the first space and the second space into a predetermined format transferable via a network, and showing the information on a screen. Herein, the network can couple the head unit and the mobile device.

When first information inputted to the vehicle is written in the first space, the second space includes second information outputted from the vehicle engagement application. When the first information is written in the second space, the first space includes the second information.

The first information can include both an input data given by a user via an input device included in at least one of the mobile device and the head unit and an operation data occurred while the vehicle engagement application is executed. The second information can be mirrored between screens of the head unit and the mobile device.

An apparatus can be provided for controlling a mobile device engaging a head unit of vehicle. The apparatus can include a controller for executing a vehicle engagement application installed in the mobile device, and a storage including a plurality of buffers, at least one of the buffers containing a frame buffer, the frame buffer including first and second spaces. After checking whether a first data responsive to execution of the vehicle engagement application is written in the first and second spaces, the controller can perform an autonomous recovery process for the vehicle engagement application if the first data is not written in the first and second spaces.

The apparatus can further include an initialization unit for preparing a predetermined space where the first and second spaces are located in the frame buffer, and informing the vehicle engagement application of addresses corresponding to the first and second spaces included in the predetermined space.

The autonomous recovery process can be designed for at least one of: analyzing an error incurred on the vehicle engagement application; requesting addition resources when the error is relevant to a lack of resources; and restarting the vehicle engagement application in response to the error.

The controller included in the mobile device can assign a high priority for allocating available resources to the vehicle engagement application.

In an apparatus for controlling a mobile device engaging a head unit of vehicle, the controller can deliver an event corresponding to a given input into the vehicle engagement application, and check whether a second data corresponding to the given input is included in at least one of the first and second spaces. According to a checking result about the second data, the controller can perform an autonomous recovery process for the vehicle engagement application.

The autonomous recovery process, after analyzing an error incurred on the vehicle engagement application, can perform at least one step of requesting addition resources when the error is relevant to a lack of resources, and restart the vehicle engagement application in response to the error.

The apparatus can further include an encoder for converting information included in either the first space or the second space, which is changed by the first data, into a predetermined format transferable via a network, and a communication module for delivering converted information in the encoder into an AVN device included in the head unit of vehicle.

The head unit and the mobile device can be coupled via at least one of wired and wireless data communication links so as to exchange at least one of the given input, a video signal, an audio signal and processed data with each other.

When first information inputted to the vehicle is written in the first space, the second space can include second information outputted from the vehicle engagement application. When the first information is written in the second space, the first space can include the second information.

The first information can includes both an input data given by a user via an input device included in at least one of the mobile device and the head unit and an operation data occurred while the vehicle engagement application is executed. The second information can be mirrored between screens of the head unit and the mobile device.

The apparatus can further include a communication channel for transferring the checking result regarding the second data between an operating system of the mobile device and the vehicle engagement application in real-time.

Further, an apparatus for controlling a mobile device, engaged with a head unit of vehicle, can include a processing system that comprises at least one data processor and at least one computer-readable memory storing a computer program. The processing system may execute a vehicle engagement application installed in the mobile device, determine first and second spaces having the same size in a frame buffer, monitor whether a first data responsive to execution of the vehicle engagement application is written in the first and second spaces, and if the first data is not written in the first and second spaces, perform an autonomous recovery process for the vehicle engagement application.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the disclosure, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

Figure 1:
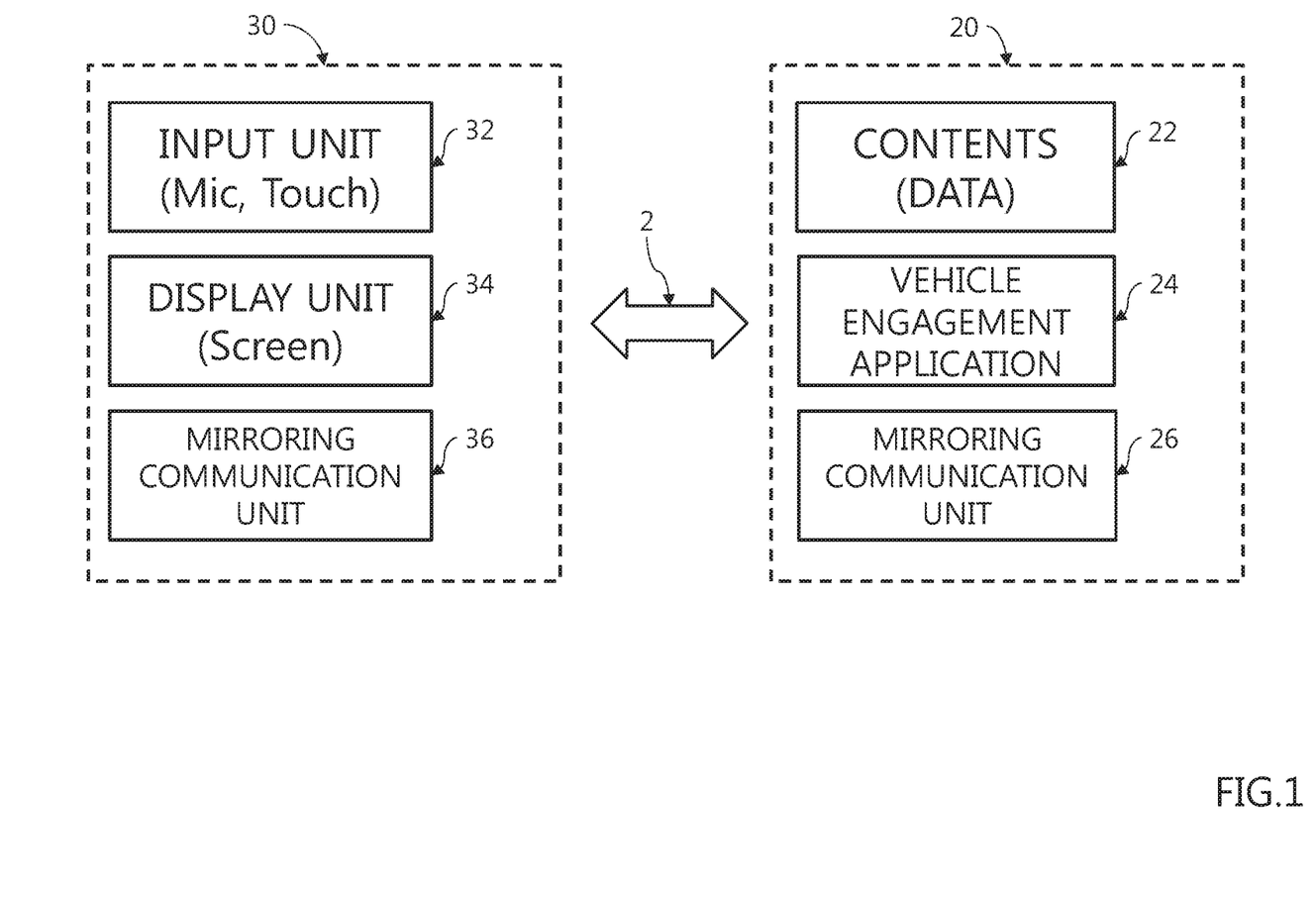
FIG. 1 shows technologies for engagement between a vehicle and a mobile device.

FIG. 1 shows technologies for engagement between a vehicle and a mobile device.

As shown, an AVN device included in a head unit 30 of vehicle can include an input unit 32, a display unit 34, and a mirroring communication unit 36. The input unit 32 can include a touch screen, a microphone, or the like. The display unit 34 can include a screen showing information, a user interface, etc. The mirroring communication unit 36 may be configured to perform a mirroring operation with the mobile device 20. Throughout the mirroring operation, it may be possible to duplicate some functions of the mobile device 20 on the head unit 30 (e.g., an in-vehicle infotainment system such as the AVN device). The mobile device 20 engaging with the head unit 30 can include one or more types of content 22, a vehicle engagement application 24 and a mirroring communication unit 26. The head unit 30 of vehicle can be coupled to the mobile device 20 via a data communication link 2.

The data communication link 2 can be formed by a physical communication channel such as a USB cable or a WiFi. When the mobile device 20 transmits a video or audio signal to the head unit 30 via the data communication link 2, the head unit 30 can decode and render signals transmitted from the mobile device 20. Further, via the data communication link 2, the head unit 30 can deliver a user's inputs such as a touch input or a button input for application control, voices inputted from a microphone for voice recognition or hands-free calls interconnection into the mobile device 20.

To ensure driving safety, the vehicle engagement application 24 operating over the mobile device 20 engaging with the head unit 30 may be required to secure a high level operational safety. However, while electronics, systems or software included in the vehicle are scrutinized by an automotive manufacturer throughout a quality verification process generally, the mobile device 20 can include various applications which are installed by a user. Further, while engaging with the head unit 30, the mobile device 20 can run various applications simultaneously. Accordingly, it is possible that malfunctions caused by other applications can adversely affect an operation of the vehicle engagement application 24.

How to engage the mobile device with the vehicle can be different based on which one is a subject or an object in the engagement. First, the vehicle engagement application 24 can arrange a second display area in a storage (not shown) included in the mobile device 20 in order to write, or store, information about a screen displayed on the mobile device 20. The information about the screen can be delivered in real time into the head unit 30, after being encoded based on a multimedia compression technique such as H.264 or the like by an operating system (OS). The head unit 30 can decode the delivered information and display decoded information via the display unit 34.

During above described engagement, the vehicle engagement application 24 may write information in both virtual spaces corresponding to a screen of the mobile device 20 and the display unit 34 of the head unit 30 respectively. However, because there is a lack of resources such as storage in the mobile device 20, if the vehicle engagement application (or other applications) has an error or bug, or if operations between the vehicle engagement application 24 and other applications conflict with each other, the vehicle engagement application cannot work properly. In those cases, information may not be written at, or in, the virtual spaces in the mobile device 20 so that a screen of the mobile device 20 can freeze, or a blank or black image (or frame) can be outputted via the screen. If this situation is left as it is, a driver can be distracted from driving a vehicle, likely to interfere with safe driving.

In above described way, the head unit 30 in the vehicle can be a passive device for merely displaying video or audio information transmitted from the mobile device 20. However, since his or her inputs or manipulations can be achieved via the head unit 30, the driver can believe that the head unit 30 does not work properly when information or data transferred from the mobile device 20 has an error. Particularly, if a driver confronts with an error or a bug via a screen of head unit 30 while a vehicle operates, safe driving may be adversely affected.

Figure 2:
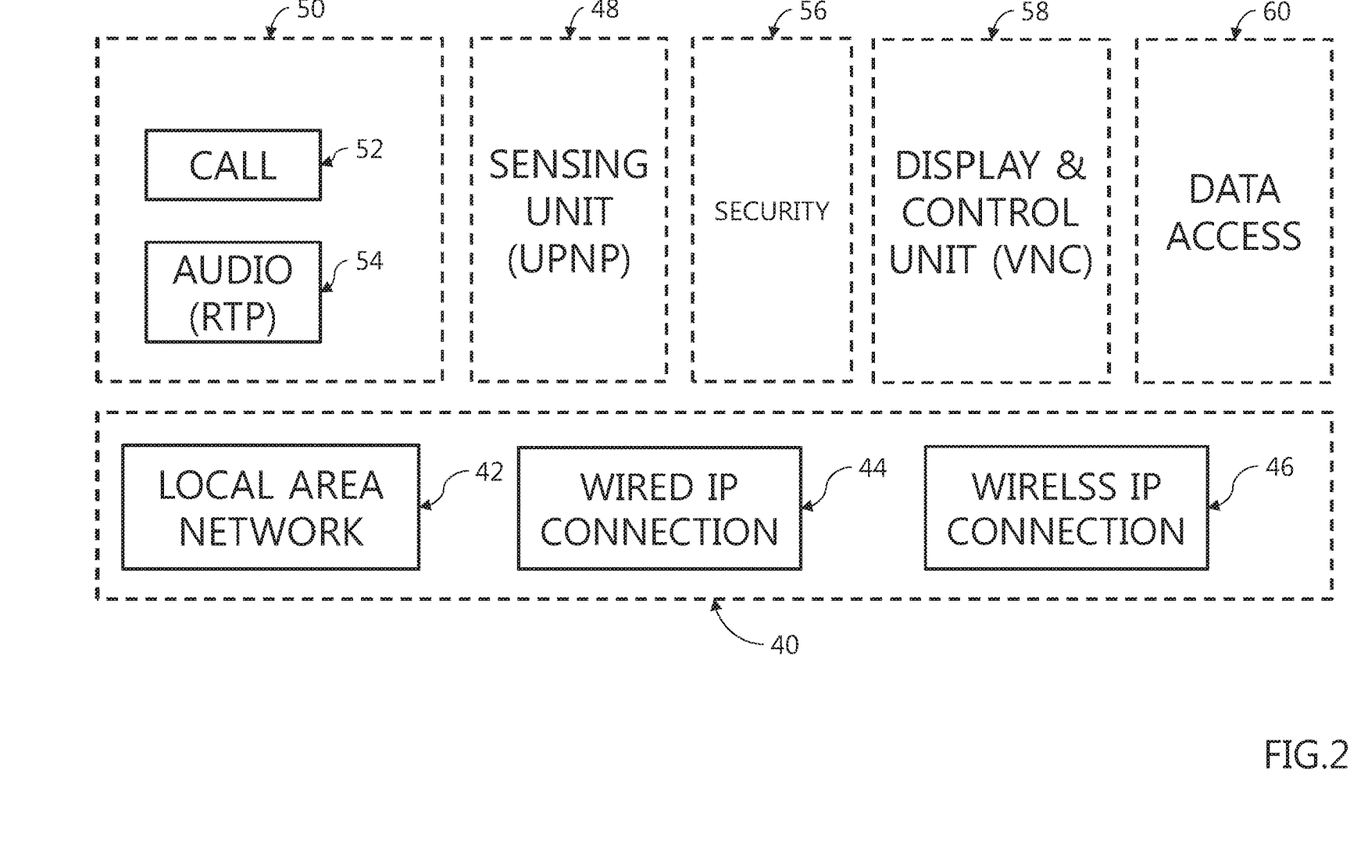
FIG. 2 shows technologies or specifications included in a mobile device engaging with a vehicle.

FIG. 2 describes technologies or specification included in a mobile device engaging with a vehicle.

As shown, the mobile device can include a physical communication connection unit 40, an audio unit 50, a sensing unit 48, a security unit 56, a display and control unit 58 and a data access unit 60, among other features. The physical communication connection unit 40 can be configured to control a physical communication channel between the mobile device and a head unit of vehicle. The audio unit 50 can handle an audio signal, and the sensing unit 48 can control a discovery process or detect neighboring devices which are available for wired or wireless data communication. The security unit 56 can take charge of a security process, while the display and control unit 58 can handle which data is shown via a screen. The data access unit 60 can handle data signals which are received from, or transmitted to, other devices such as GPS via a network.

By way of example but not limitation, the physical communication connection unit 40 can include a local area network unit 42 configured to control a wireless local area network communication such as a Bluetooth connection, a wired data communication unit 44 configured to control a data communication via a wired communication channel based on an Internet protocol (IP) and/or a wireless data communication unit 46 configured to control a data communication via a wireless communication channel based on an Internet protocol (IP).

The audio unit 50 engaging with the head unit of vehicle can provide a call service 52 based on a Hands Free Profile (HFP), an audio service 54 delivering music, sound or voice based on a Real-time Transport Protocol (RTP), and the like. Herein, the Real-time Transport Protocol (RTP) may be a network protocol used in a standardized packet format for delivering an audio signal and a video signal over Internet protocol (IP) networks. The Real-time Transport Protocol (RTP) can be used in communication and entertainment systems that involve streaming media.

The display and control unit 58 can use a virtual network computing (VNC) system supporting multiple platforms to remotely control another device under a network environment. The virtual network computing (VNC) system can capture data on a whole screen, encode a captured data, and transfer encoded data to other devices. The virtual network computing (VNC) system can be applicable over plural operating systems or between different operating systems.

Referring to FIGS. 1 and 2, plural units included in the mobile device 20 can be used for transferring a current screen as it is to a head unit 30 of vehicle. While driving, a driver can look at the same screen of mobile device 20 via a screen in the head unit 30, and control functions of mobile device 20 on a touch screen input mode. These mirroring operations can be performed over a virtual network computing (VNC) system, a Real-time Transport Protocol (RTP), a Bluetooth (BT), a Universal Plug and Play (uPNP), or a similar system.

The mobile device 20 can be an agent communicating with other devices via a communications network as well as a server providing a virtual network computing (VNC) system. The head unit 30 providing a bigger screen than the mobile device 20 can be a client of virtual network computing (VNC) system so as to show the screen of mobile device 20 as it is via the larger screen. To ensure that the screen of head unit 30 shows the same screen of mobile device 20, the virtual network computing (VNC) server working on the mobile device 20 can read a frame buffer of mobile device 20.

The frame buffer is a kind of storage in a memory device, containing a bitmap that is driven to a video display in Raster scan mode from a memory buffer containing a complete frame of data. A graphic process processes image information received from a central processing unit (CPU) to write the image information in the frame buffer. Pixel information of a screen can be stored in each memory unit in the frame buffer. For example, information regarding each pixel can be a predetermined value of color or bit map, so data can be shown on a pixel of a screen if inputted to the corresponding memory unit of the frame buffer. The frame buffer can be separated from a main memory or storage for an operating system, sometimes operating in an accelerated manner in a particular method.

Figure 3:
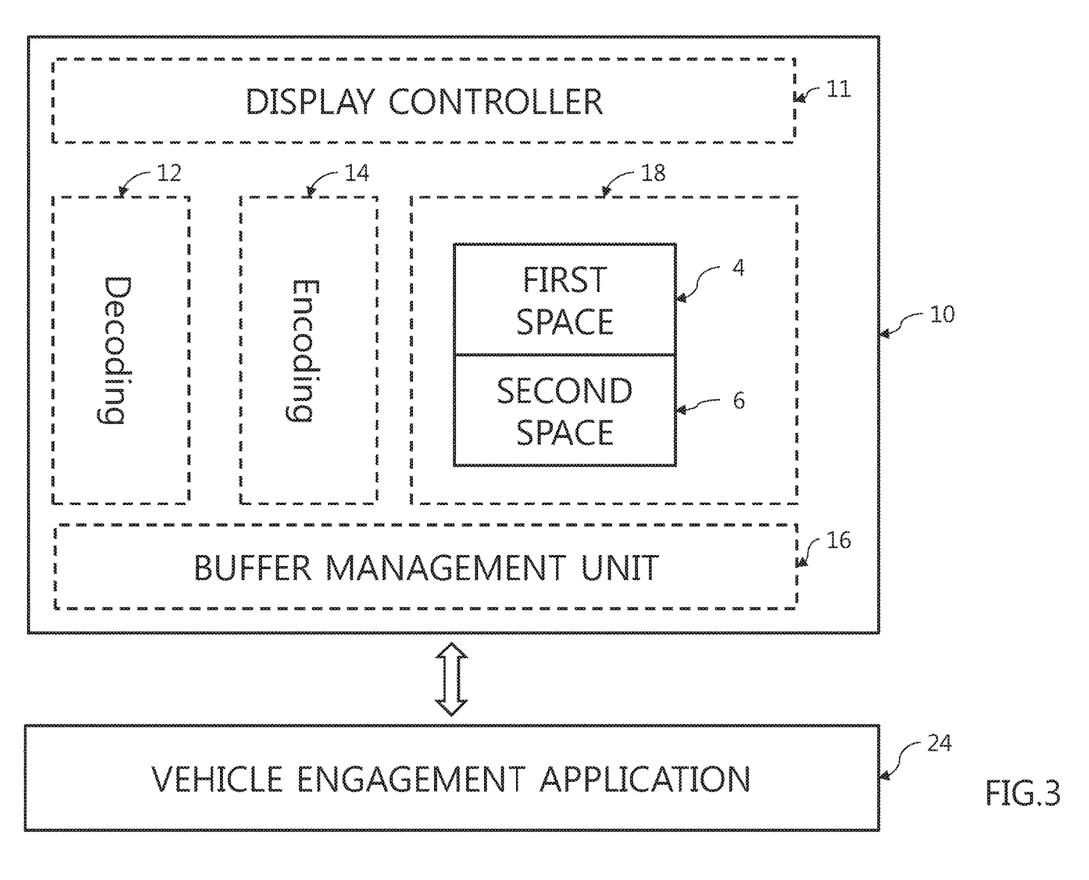
FIG. 3 shows an operation of mobile device engaging with a vehicle.

FIG. 3 shows an operation of a mobile device engaging with a vehicle.

As shown, the mobile device can include a framework 10 and a vehicle engagement application 24. The framework 10 can include a buffer management unit 16 configured to control plural functional buffers 12, 14, 18 and a display controller 11 configured to perform a particular procedure for delivering information into a display unit.

By way of example but not limitation, the framework 10 can include a frame buffer 18, an encoding buffer 14 and a decoding buffer 12. The framework 10 can include various buffers, each corresponding to each function performed by the mobile device.

The frame buffer 18 included in the mobile device engaging with a vehicle can include a first space 4 and a second space 6. The first space 4 and the second space 6 can have the same size.

Figure 4:
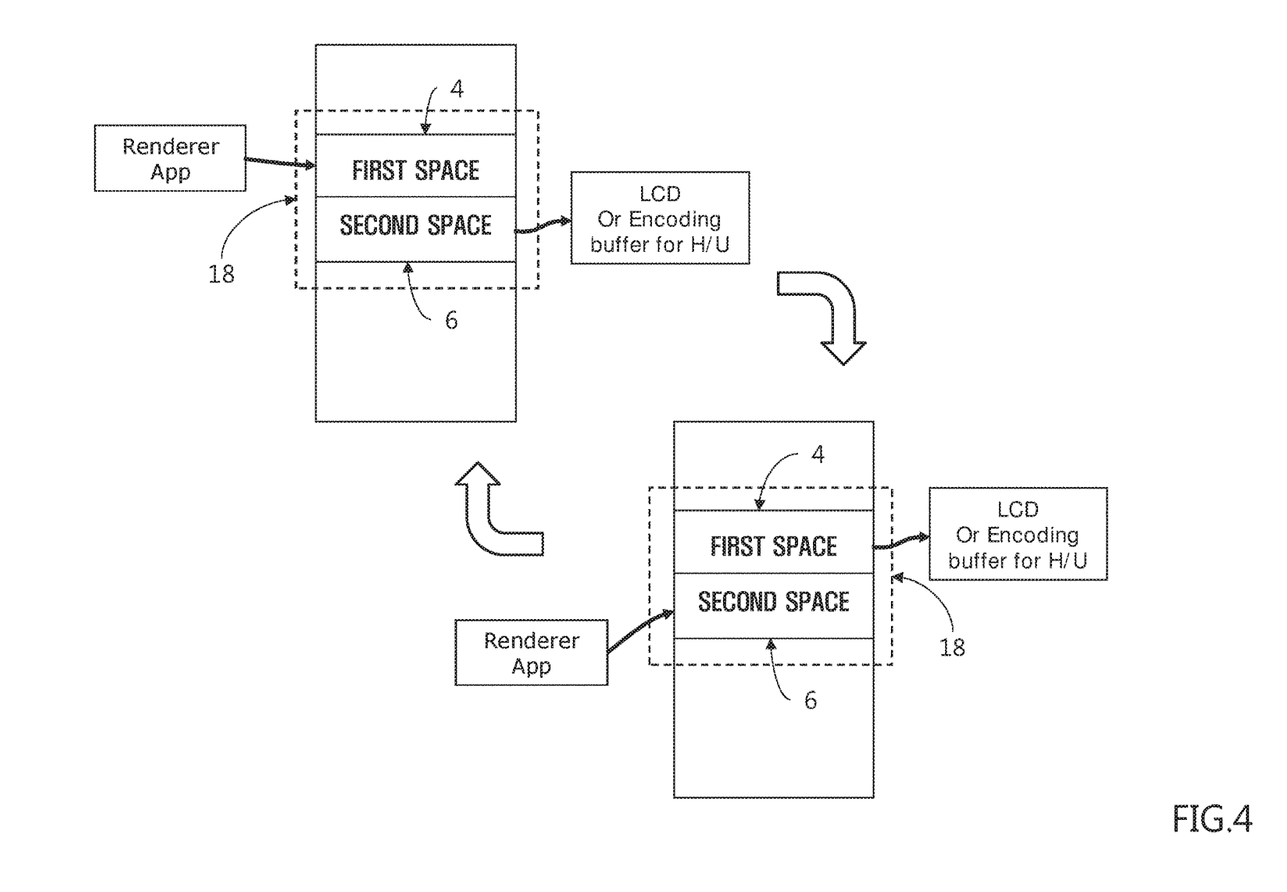
FIG. 4 shows operation of frame buffer in a mobile device.

FIG. 4 shows an operation of a frame buffer in a mobile device.

As shown, the frame buffer 18 may include the first space 4 and the second space 6. Referring to FIGS. 1 and 4, the engagement between the mobile device 20 and the head unit is based on a mirroring method for sharing information regarding a screen and a sound appearing at the mobile device 20. By the mirroring method, the mobile device can transmit touch events to, or receive touch units from, the head unit. The touch events can control functions performed over the mobile device.

By way of example but not limitation, if first information inputted to the vehicle is written in the first space 4, the second space 6 includes second information outputted from the vehicle engagement application. When the first information is written in the second space 6, the first space 4 includes the second information. Herein, the second information is mirrored by the first information.

Herein, the first information can include an input data given by a user via an input device included in at least one of the mobile device 20 and the head unit 30, or operation data deriving from while the vehicle engagement application is run. The second information can be shown on both screens of the mobile device 20 and the head unit 30.

Though a specific implementation or design can be different, the above described engagement method can use the frame buffer 18 formed in storages of the mobile device. For example, the first space 4 is assigned to a screen of a mobile device while the second space is assigned to a screen included in the head unit of vehicle. When the frame buffer 18 is established, addresses corresponding to the first space 4 and the second space 6 are informed into the vehicle engagement application. After writing graphic data or rendering data or images at a specific space in the frame buffer 18, the vehicle engagement application can make an operating system (OS), or another application, compress rendered information at the space. The compressed information can be delivered via a communication channel such as USB cable or Wi-Fi.

By way of example but not limitation, as shown in FIG. 4, at least two blocks can be secured respectively for read and write operations in the first space 4 for storing information outputted via a screen of mobile device as well as the second space 6 for storing information delivered into an encoder and transmitted into a screen in the head unit. The vehicle engagement application may write data at the frame buffer 18 and deliver the corresponding data into a screen simultaneously. If only one block is used for each of the first and second spaces 4, 6, read and write operations can be performed simultaneously at the same block in the frame buffer, and thus data can be changed while shown via the screen. In this case, a user (or a driver) can watch a flickering screen or a partially distorted screen. Referring to FIG. 4, when there is updating information on a screen, the first space 4 and the second space 6 in the frame buffer 18 can be accessed alternatively in response to a vertical synchronization signal Vsync of the display device. These operations can be visualized as a ping-pong game, so the frame buffer can be referred as to a ping-pong buffer.

In a case when the mobile device engages with the head unit of vehicle, an operating system (OS) working over mobile device can initialize a frame buffer (e.g., the first space 4 or the second space 6) available for a current write operation, and then inform a vehicle engagement application of a memory address corresponding to the initialized space. As shown in FIG. 4, the address of the first space 4 may be delivered if the first space 4 is available for write operation, while the address of the second space 6 is delivered if the second space 6 is available. The vehicle engagement application may write a graphic data outputted to a vehicle at a space pointed by the delivered address. Errors or problems caused while the vehicle engagement application writes the graphic data can be described as follows.

When an error or problem occurs at a timing of starting vehicle engagement application, the initialized space in the frame cannot be written by the vehicle engagement application so that compressed data regarding the initialized space where no data is written can be delivered into and shown via a screen of the head unit. In this case, a driver (or a user) may watch a blank screen or a black screen.

Further, it can be assumed that a vehicle engagement application cannot put down a graphic data in the frame buffer supported by an operating system (OS) of mobile device because of errors or problems occurred while the vehicle engagement application operates. In this case, a screen in the head unit of vehicle can freeze even if a driver would touch a screen so as to control performed functions. When the screen freezes, a driver can believe that there are problems in the head unit of the vehicle. If trying to resolve the frozen screen while driving, a driver can be distracted so that safe driving could be compromised.

Figure 5:
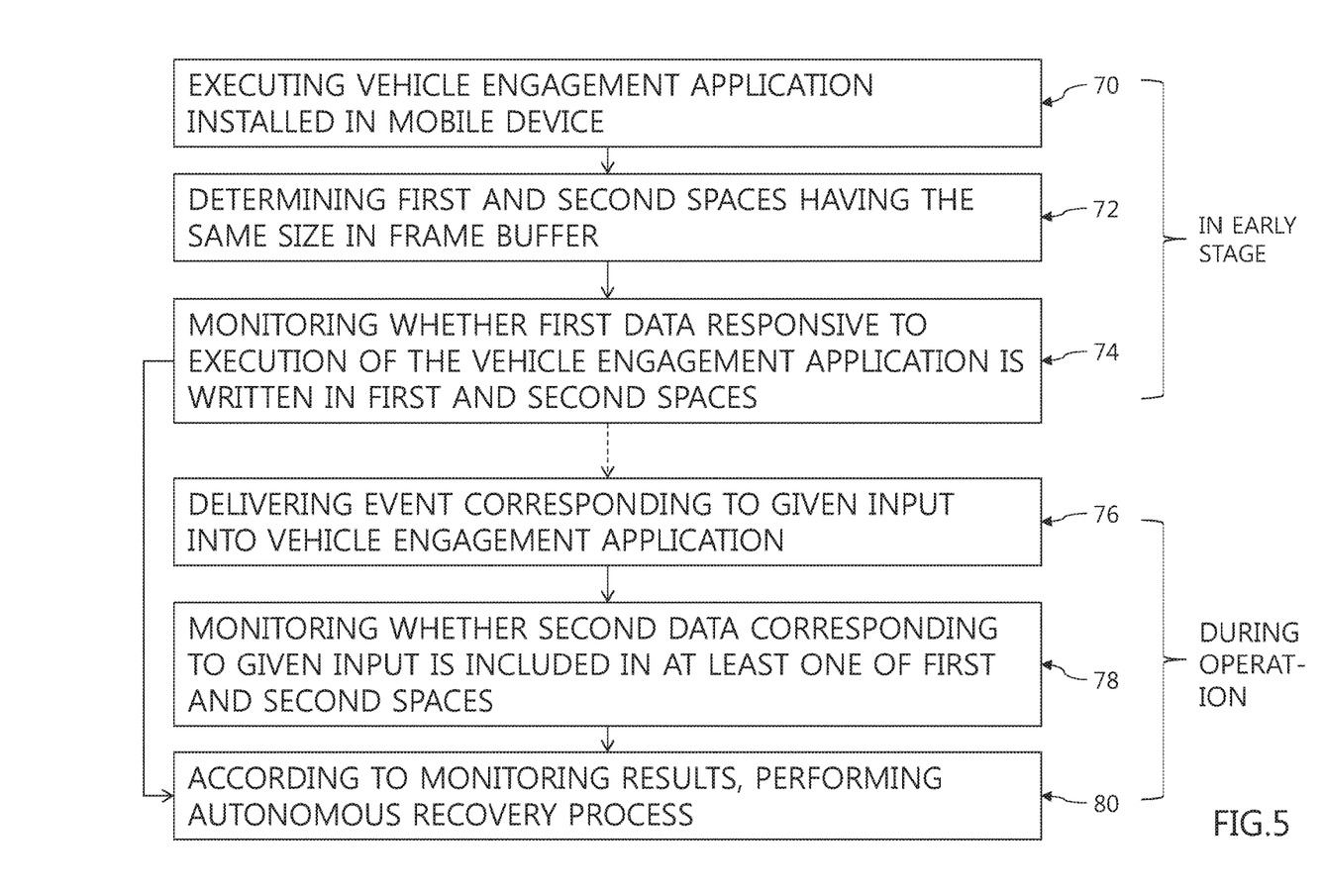
FIG. 5 describes a method for controlling a mobile device engaging with a vehicle.

FIG. 5 describes a method for controlling a mobile device to engage with a vehicle.

As shown, the method for controlling a mobile device engaging a head unit of a vehicle can include executing a vehicle engagement application installed in the mobile device (step 70) and determining first and second spaces having the same size in a frame buffer (step 72). It may be monitored whether a first data responsive to execution of the vehicle engagement application is written in the first and second spaces (step 74). If the first data is not written in the first and second spaces, an autonomous recovery process may be performed for the vehicle engagement application (step 80). These methods may be able to detect and recover an error or problem occurring at a timing of starting a vehicle engagement application (e.g., a black screen or a blank screen outputted because any data is not written at an initialized space in the frame buffer).

The method can further include initializing a predetermined space where the first and second spaces are located in the frame buffer, and informing the vehicle engagement application of addresses corresponding to the first and second spaces included in the initialized predetermined space.

Further, in the method, information including the first data written in at least one of the first space and the second space can be converted into a predetermined format transferable via a network. The information changed by the first data can be shown via a screen. Herein, the network is a kind of wired or wireless way of connecting the mobile device with an AVN device included in the head unit of vehicle. By way of example but not limitation, the wired or wireless way can be achieved by at least one of a wired communication technique based on a USB cable, a wireless local communication technique based on a Bluetooth or a similar technique, and a wireless data communication technique based on Wi-Fi or the like.

The method for controlling the mobile device can include delivering an event corresponding to a given input into the vehicle engagement application (step 76). It may be monitored whether a second data corresponding to the given input is included in at least one of the first and second spaces (step 78). According to a monitoring result about the second data, the autonomous recovery process for the vehicle engagement application can be performed (step 80). These procedures can detect and recover an error or problem occurring while the vehicle engagement application is operating (e.g., a screen freezes when an input is given by a user).

By way of example but not limitation, the method for controlling the mobile device can be performed by an operating system (OS) working over a mobile device, a software application interface, program or process such as a mobile platform for controlling internal operations between the operating system (OS) and the vehicle engagement application, or the like.

Figure 6:
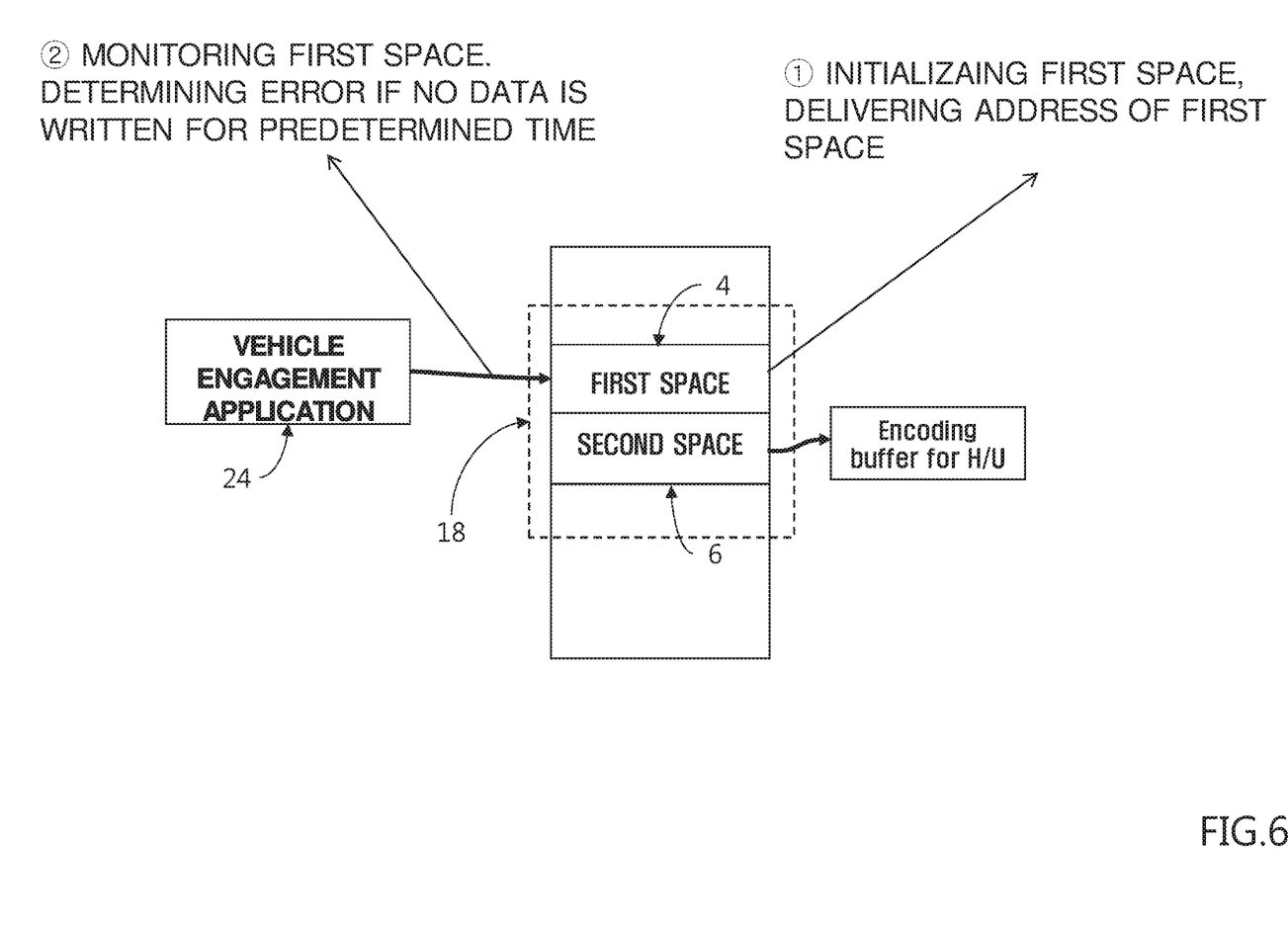
FIG. 6 shows a first error recovery process when a vehicle engagement application starts.

FIG. 6 shows a first error recovery process when a vehicle engagement application starts.

As shown, an operating system (or mobile platform) of mobile device can initialize a first space 4 in a frame buffer 18 where a graphic data shown on a screen would be written by a vehicle engagement application 24. The operating system (or mobile platform) can inform the vehicle engagement application 24 of an address of the first space 4. The operating system (or mobile platform) can monitor whether valid data is written at the frame buffer 18 (i.e., the first space 4).

If the vehicle engagement application 24 does not work properly and does not put down, or write, a graphic data at the first space 4 in the frame buffer 18, the first space 4 may maintain a predetermined value initialized by the operating system (or mobile platform). When the initialized value itself is encoded and delivered into a head unit, a screen in the head unit can output a black screen or a blank screen.

If the frame buffer 18 (e.g., the first space 4) is established, the operating system (or mobile platform) can monitor whether any data is written in the frame buffer 18 during a predetermined time after the vehicle engagement application 24 is executed. Herein, the predetermined time can be determined based on a frame rate. The frame rate may be how many frames are outputted every second, i.e., the frequency (rate) at which an imaging device displays consecutive images called frames, determining a transferring period of an image or video signal.

If any data is not written in the frame buffer 18 (e.g., the first space 4) during the predetermined time after the vehicle engagement application 24 is run, the operating system (or mobile platform) can determine that there is a problem over the mobile device. Instead of delivering the black screen or the blank screen, the operating system (or mobile platform) can perform an autonomous recovery process.

Figure 7:
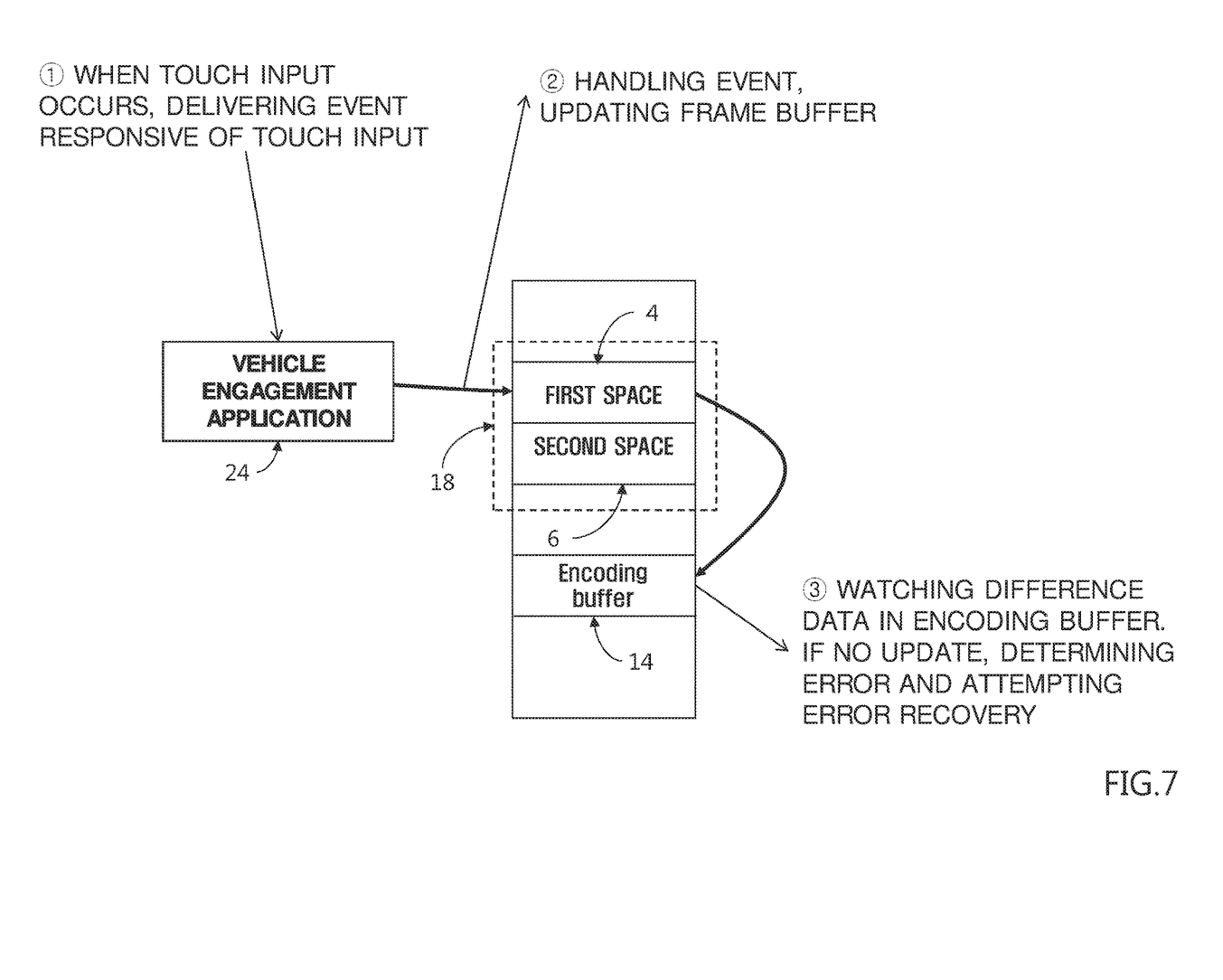
FIG. 7 shows a second error recovery process while a vehicle engagement application operates.

FIG. 7 shows a second error recovery process while a vehicle engagement application operates.

As shown, an event occurring in response to a user's input from a head unit (e.g., a screen of an AVN device or an input button) can be delivered into a vehicle engagement application 24. An operating system (or platform) can check whether the vehicle engagement application 24 updates a screen (or whether the screen freezes). To detect a frozen screen, the operating system (or platform) can use a video encoder to recognize whether there is a difference data (data variance) between a previous screen and a current screen.

When an event such as a user's touch input at the head unit of a vehicle occurs, the event is delivered into the vehicle engagement application 24. In order to perform any operation corresponding to the event and inform a user (driver) of a performing result, the vehicle engagement application 24 may update information stored in the frame buffer 18 (e.g., the first space 4). Then, the updated data in the first space 4 of the frame buffer 18 may be encoded by the video encoder and delivered into the head unit of a vehicle. In these processes, the video encoder can calculate or recognize a difference in data from previous frame information. If there is no difference in data (i.e., no updating information), the operating system (or platform) can determine that there is a problem. Accordingly, an autonomous recovery process can be performed in the mobile device.

Figure 8:
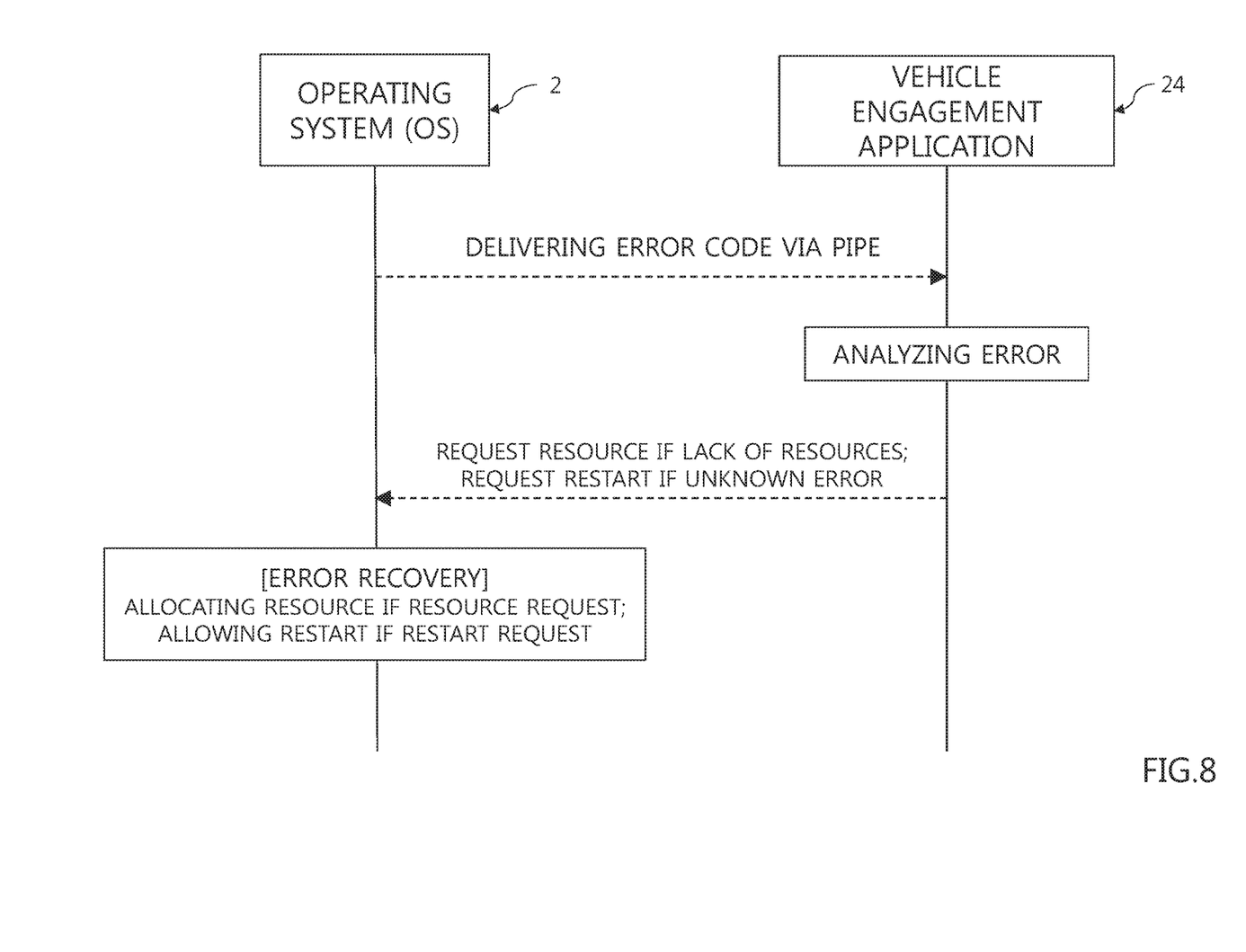
FIG. 8 shows an operation for error recovery in a vehicle engagement application.

FIG. 8 shows an operation for error recovery in a vehicle engagement application.

As shown, if an error or problem over an operation of vehicle engagement application 24 is detected, an operating system (OS) 2 of the mobile device can inform that data is not shown properly via a logical pipe (or channel) connecting with the vehicle engagement application 24. If the vehicle engagement application 24 receives an above-described message from the operating system 2, an autonomous recovery process can analyze an error incurred on the vehicle engagement application 24. If the error is relevant to a lack of resources, the autonomous recovery process can request additional resources. However, if the error occurs because of unknown reasons, the autonomous recovery process can request the operating system 2 to shut down and restart the vehicle engagement application 24. At this time, the autonomous recovery process can make the operating system 2 secure the maximum of available resources before restarting in order to assign to the vehicle engagement application 24, or immediately restart the vehicle engagement application 24 so as to attempt error recovery.

By way of example but not limitation, in order to control the mobile device, the step of performing an autonomous recovery process (step 80) shown in FIG. 5 can include analyzing an error occurring in the vehicle engagement application 24, requesting addition resources when the error is relevant to a lack of resources, and restarting the vehicle engagement application 24 in response to the error. Further, a data processor (or an operating system, mobile platform) included in the mobile device can assign a high priority for allocating available resources to the vehicle engagement application 24.

As above described, when there is an error or problem over the vehicle engagement application, the method for controlling the mobile device can detect the error or problem occurring in the mobile device. A data processor (or operating system or mobile platform) can communicate with the vehicle engagement application and perform the autonomous recovery process. Accordingly, it can be prevented that a driver (or user) would be distracted by a black/blank screen or a frozen screen in the head unit of vehicle.

Figure 9:
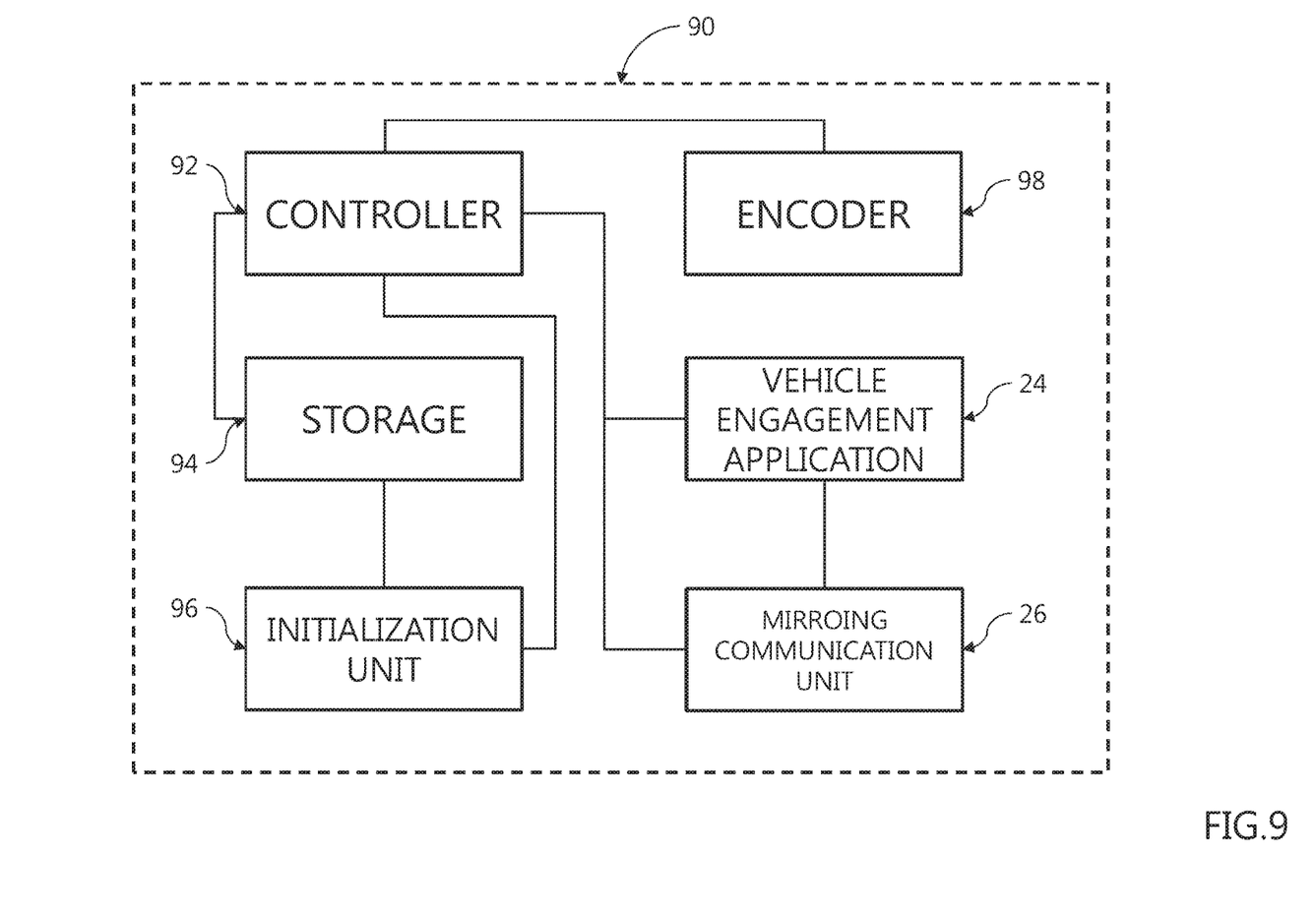
FIG. 9 describes an apparatus for controlling a mobile device engaging with a vehicle.

FIG. 9 describes an apparatus for controlling a mobile device engaging with a vehicle.

As shown, the mobile device 90 engaging an AVN device included in a vehicle can include a controller 92 and storage 94. The controller 92 can be configured to execute a vehicle engagement application 24 installed in the mobile device. The storage 94 can include a plurality of buffers, at least one of the buffer containing a frame buffer. The frame buffer can include first and second spaces, which may have the same size. The controller 92 can check whether a first data responsive to an execution of the vehicle engagement application 24 is written in the first and second spaces. If the first data is not written in the first and second spaces, the controller 92 can perform an autonomous recovery process for the vehicle engagement application 24.

Further, the mobile device 90 can include an initialization unit 96 configured to prepare a predetermined space where the first and second spaces are located in the frame buffer. The initialization unit 96 can inform the vehicle engagement application 24 of addresses corresponding to the first and second spaces included in the predetermined space.

By way of example but not limitation, the autonomous recovery process can be designed for at least one of: analyzing an error incurred in the vehicle engagement application 24; requesting additional resources when the error is relevant to a lack of resources; and restarting the vehicle engagement application 24 in response to the error. Herein, the controller 92 included in the mobile device 90 can assign a high priority for allocating available resources to the vehicle engagement application 24.

Meanwhile, the controller 92 can deliver an event corresponding to a given input into the vehicle engagement application 24, and check whether a second data corresponding to the given input is included in at least one of the first and second spaces. According to a checking result about the second data, the controller 92 can perform an autonomous recovery process for the vehicle engagement application 24.

The mobile device 90 can include a communication channel (not shown) for transferring the checking result regarding the second data between an operating system (not shown) of the mobile device 90 and the vehicle engagement application 24 in real-time.

Further, the mobile device can include an encoder and a mirroring communication module 26. Like a video encoder, the encoder 98 can convert information, stored in at least one of the first space and the second space, into a predetermined format transferable via a network. The mirroring communication module 98 can deliver converted information outputted from the encoder 92 into an AVN device included in the head unit of a vehicle. Throughout the mirroring communication module 98, the head unit and the mobile device 90 are communicated with each other via at least one of a wired and wireless data communication link so as to exchange at least one of the given input, a video signal, an audio signal and processed data with each other.

By way of example but not limitation, at the frame buffer in the storage 94, when first information inputted to the vehicle is written in the first space, the second space can include second information outputted from the vehicle engagement application. Otherwise, when the first information is written in the second space, the first space can include the second information. Herein, the first information can include both an input data given by a user via an input device included in at least one of the mobile device and the head unit and an operation data occurring while the vehicle engagement application is executed. The second information can be mirrored between screens of the AVN device and the mobile device.

The mobile device can manage and monitor the frame buffer (or display buffer) used for providing graphic data to the vehicle engagement application or the data processor (operating system or mobile platform). Further, the mobile device can determine whether a screen should be updated in response to the engagement with the head unit of vehicle, and detect differences in data recognized while encoding graphic data included in the frame buffer to understand whether the screen has frozen.

Since a pipe (logical channel) can be formed only for internal communication between the vehicle engagement application and the data processor (operating system, mobile platform or etc.), information regarding an error or problem can be delivered via the pipe even when an unexpected error has occurred over the engagement operation between the mobile device and the vehicle. The mobile device can autonomously handle a recovery process in real time.

As above described, while a mobile device engages with an AVN device, it can be avoided that a user or a driver loses control of the AVN device because of an internal error occurring in the mobile device.

Further, when unexpected errors occur during a mobile device engaging with an AVN device, a vehicle engagement application may be executed with a priority according to a predetermined step or process.

For instance, when a vehicle engagement application starts for engagement with a vehicle, it can be prevented to show a black screen when any data loaded or given by the vehicle engagement application does not properly write on a display buffer.

After detecting an erroneous situation if a screen does not properly respond to any event (e.g., a touch input) delivered from a head unit of vehicle, which requests for a screen update, a mobile device can recover the erroneous situation autonomously.

After reporting an error via a pipeline/channel only for an operation or communication between an operating system (OS) and a vehicle engagement application included in a mobile device, an apparatus can receive a feedback about the error so as to achieve error recovery.

The aforementioned embodiments are achieved by combination of structural elements and features of the disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the disclosure. The order of operations described in the embodiments of the disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

It will be apparent to those skilled in the art that various modifications and variations can be made in the disclosure without departing from the spirit or scope of the disclosures. Thus, it is intended that the disclosure covers the modifications and variations of this disclosure provided they come within the scope of the appended claims and their equivalents.

What is claimed is:

1. A method for controlling a mobile device engaging with a head unit of vehicle, the method comprising:
    executing a vehicle engagement application installed in the mobile device;
    determining first and second spaces having the same size in a frame buffer;
    monitoring whether a first data responsive to an execution of the vehicle engagement application is written in the first and second spaces; and
    when the first data is not written in the first and second spaces, performing an autonomous recovery process for the vehicle engagement application,
    wherein the determining first and second spaces comprises:
    initializing a predetermined space where the first and second spaces are located in the frame buffer; and
    delivering addresses corresponding to the first and second spaces included in the predetermined space into the vehicle engagement application.

2. The method according to claim 1, further comprising:
    delivering an event corresponding to a given input into the vehicle engagement application;
    checking whether a second data corresponding to the given input is included in at least one of the first and second spaces; and
    according to a checking result about the second data, performing the autonomous recovery process for the vehicle engagement application.

3. The method according to claim 1, wherein the performing an autonomous recovery process comprises:
    analyzing an error occurring in the vehicle engagement application;
    requesting addition resources when the error is relevant to a lack of resources; and
    restarting the vehicle engagement application in response to the error.

4. The method according to claim 3, wherein the performing an autonomous recovery process further comprises:
    assigning, by a processor included in the mobile device, a high priority for allocating available resources to the vehicle engagement application.

5. The method according to claim 1, further comprising:
    converting information including the first data written in at least one of the first space and the second space into a predetermined format transferable via a network; and
    showing the information on a screen.

6. The method according to claim 5, wherein the network couples the head unit and the mobile device.

7. The method according to claim 1, wherein
    when a first information inputted to the vehicle is written in the first space, the second space includes a second information outputted from the vehicle engagement application; and
    when the first information is written in the second space, the first space includes the second information.

8. The method according to claim 7, wherein the first information includes both an input data given by a user via an input device included in at least one of the mobile device and the head unit and an operation data occurring while the vehicle engagement application is executed, and
    the second information is mirrored between screens of the head unit and the mobile device.

9. An apparatus for controlling a mobile device engaging a head unit of vehicle, the apparatus comprising:
    a controller for executing a vehicle engagement application installed in the mobile device;
    a storage including a plurality of buffers, at least one of the buffers containing a frame buffer, the frame buffer including first and second spaces; and
    an initialization unit for preparing a predetermined space where the first and second spaces are located in the frame buffer, and for informing the vehicle engagement application of addresses corresponding to the first and second spaces included in the predetermined space,
    wherein, after checking whether a first data responsive to an execution of the vehicle engagement application is written in the first and second spaces, the controller performs an autonomous recovery process for the vehicle engagement application when the first data is not written in the first and second spaces.

10. The apparatus according to claim 9, wherein the autonomous recovery process is designed for at least one of:
    analyzing an error occurring in the vehicle engagement application;
    requesting addition resources when the error is relevant to a lack of resources; and restarting the vehicle engagement application in response to the error.

11. The apparatus according to claim 9, wherein the controller included in the mobile device assigns a high priority for allocating available resources to the vehicle engagement application.

12. An apparatus for controlling a mobile device engaging a head unit of vehicle, the apparatus comprising:
- a controller for executing a vehicle engagement application installed in the mobile device;
- a storage including a plurality of buffers, at least one of the buffers containing a frame buffer, the frame buffer including first and second spaces; and
- an initialization unit for preparing a predetermined space where the first and second spaces are located in the frame buffer, and for informing the vehicle engagement application of addresses corresponding to the first and second spaces included in the predetermined space, wherein the controller further:
- delivers an event corresponding to a given input into the vehicle engagement application;
- checks whether a second data corresponding to the given input is included in at least one of the first and second spaces; and
- according to a checking result about the second data, performs an autonomous recovery process for the vehicle engagement application.

13. The apparatus according to claim 12, wherein the autonomous recovery process, after analyzing an error occurring in the vehicle engagement application, performs at least one step of requesting addition resources when the error is relevant to a lack of resources, and restarting the vehicle engagement application in response to the error.

14. The apparatus according to claim 12, further comprising:
- an encoder for converting information included in either the first space or the second space, which is changed by the first data, into a predetermined format transferable via a network; and
- a communication module for delivering converted information in the encoder into an audio-video-navigation (AVN) device included in the head unit of vehicle.

15. The apparatus according to claim 12, wherein the head unit and the mobile device are coupled via at least one of wired and wireless data communication links so as to exchange at least one of the given input, a video signal, an audio signal and processed data with each other.

16. The apparatus according to claim 12, wherein
when a first information inputted to the vehicle is written in the first space, the second space includes a second information outputted from the vehicle engagement application; and
when the first information is written in the second space, the first space includes the second information.

17. The apparatus according to claim 16, wherein the first information includes both an input data given by a user via an input device included in at least one of the mobile device and the head unit and an operation data occurring while the vehicle engagement application is executed, and
the second information is mirrored between screens of the head unit and the mobile device.

18. The apparatus according to claim 12, further comprising:
- a communication channel for transferring the checking result regarding the second data between an operating system of the mobile device and the vehicle engagement application in real-time.

* * * * *